United States Patent [19]
Allen et al.

[11] Patent Number: 5,748,611
[45] Date of Patent: May 5, 1998

[54] SYSTEM AND METHOD FOR RESTORING A TELECOMMUNICATIONS NETWORK USING CONSERVATIVE BANDWIDTH RESERVATION AND SELECTIVE MESSAGE REBROADCAST

[75] Inventors: John David Allen, Garland, Tex.; Ching-Hua Chow, Colorado Springs, Colo.; Jasvantrai C. Shah, Richardson, Tex.

[73] Assignee: MCI Corporation, Washington, D.C.

[21] Appl. No.: 673,219

[22] Filed: Jun. 27, 1996

[51] Int. Cl.$^6$ .................................................. H04L 12/24
[52] U.S. Cl. .......................... 370/224; 370/228; 340/827
[58] Field of Search .............................. 370/217, 218, 370/221, 225, 228, 242, 248; 395/181, 182.01, 182.02; 379/221; 340/825.01, 827

[56] References Cited

U.S. PATENT DOCUMENTS

| | | | |
|---|---|---|---|
| 4,393,493 | 7/1983 | Edwards | 370/16 |
| 4,956,835 | 9/1990 | Grover | 370/16 |
| 5,068,892 | 11/1991 | Livanos | 379/221 |
| 5,168,495 | 12/1992 | Smith | 370/85.6 |
| 5,235,599 | 8/1993 | Nishimura et al. | 371/11.2 |
| 5,311,586 | 5/1994 | Bogart et al. | 379/221 |
| 5,459,716 | 10/1995 | Fahim et al. | 370/16 |
| 5,461,608 | 10/1995 | Yoshiyama | 370/16.1 |
| 5,469,439 | 11/1995 | Thaler et al. | 370/94.3 |
| 5,479,608 | 12/1995 | Richardson | 395/182.02 |
| 5,495,471 | 2/1996 | Chow et al. | 370/16 |
| 5,513,345 | 4/1996 | Sato et al. | 395/182.02 |
| 5,519,709 | 5/1996 | Albrecht et al. | 370/94.3 |
| 5,537,532 | 7/1996 | Chng et al. | 395/182.02 |
| 5,548,639 | 8/1996 | Ogura et al. | 379/221 |
| 5,550,805 | 8/1996 | Takatori et al. | 370/16.1 |
| 5,581,791 | 12/1996 | Ludwig et al. | 395/860 |

*Primary Examiner*—Hassan Kizou

[57] ABSTRACT

A system and method for restoration of a disrupted telecommunications path between a source node and a destination node via at least one tandem node. The operation of the present invention proceeds in five phases: notification, broadcast, path trace-out, confirmation and cleanup. In the notification phase, the path's source and destination nodes are notified of the disruption. In the broadcast phase, the network is flooded with PACK messages to locate restoration paths; selective rebroadcasting of the PACK messages limits the volume of restoration message traffic. In the path trace-out phase, bandwidth is conservatively reserved along the restoration paths indicated by the PACK messages. In the confirmation phase, restoration paths are built up step-wise along the traced-out paths, thereby restoring the disrupted path between the source and destination nodes. In the clean-up phase, all of the network resources that were allocated to restoration of the disrupted path, and that are no longer needed, are released.

14 Claims, 17 Drawing Sheets

SYSTEM AND METHOD FOR RESTORING A TELECOMMUNICATIONS NETWORK USING CONSERVATIVE BANDWIDTH RESERVATION AND SELECTIVE MESSAGE REBROADCAST

BACKGROUND OF THE INVENTION

1. Field of the Invention

The field of the present invention relates generally to network restoration, and more particularly to distributed network restoration using conservative bandwidth reservation and selective message rebroadcasting.

2. Related Art

A communications network serves to transport information among a number of locations. The information to be transported is usually presented to the network in the form of time-domain electrical signals and may represent any combination of telephony, video, or computer data in a variety of formats. To transport such information, a typical communications network creates a "path" consisting of various physical sites, or "nodes," and information conduits, called "links," that interconnect the nodes. Each link serves to carry information from one node to another node. Each node may contain equipment for combining, separating, transforming, conditioning, and routing the information signals.

One or more links that connect two nodes are collectively referred to as a "span." Nodes are often connected by a multiplicity of parallel links due to the need for capacity. In addition, redundant spare links are commonly added between nodes with the intent that they usually carry no data traffic but may be used as alternate routes in the event of partial network failure. This spare link capacity, coupled with the switching ability within the network nodes, allows the network to use rerouting to recover from partial failures by circumventing the failed network elements.

The information traffic of even a single network data path represents a formidable volume of vital information flow—equivalent to tens of thousands of simultaneous phone calls. Sudden failure of such an information channel can cause a significant loss in revenues for a network owner and loss of commerce and other benefits for the network subscribers. Consequently, techniques have been devised for assuring that, when one network path fails, other, usually spare, paths are used to circumvent the failure and restore normal traffic flow as quickly as possible. Among the automatic restoration techniques, there are two common approaches—centralized and distributed.

The centralized approaches rely upon a central database that is accessed by all of the nodes. In the variations on this approach, this central database contains information regarding the overall network topology, preplanned actions in response to specific failures, or both. These approaches suffer due to a) the need to constantly update the database as the network is enlarged or reconfigured and b) the delay through, and potential failure of, communications links that join the nodes to a central database or a network control center.

The distributed approaches are characterized by the use of self-contained operating logic within the nodes that form the network. Generally, a distributed restoration approach does not use a centralized database but instead relies upon node logic acting upon local information via connections to adjacent nodes. The intent of these approaches is to use the network itself as the data processing matrix upon which to compute the optimal restoration routes.

Distributed network restoration approaches are of two types: link-based and path-based. Link-based approaches are directed to restoring a single failed link between two nodes by finding an alternate path between the two nodes. Link-based approaches are of two types: single-prong and double-prong. In the double-prong approach, each node in a pair connected by a failed link attempts to find an alternate path to the other. In the single-prong approach, only one of the nodes makes the attempt. A well-known single-prong link-based distributed restoration technique is taught by Wayne D. Grover in U.S. Pat. No. 4,956,835 which is incorporated herein by reference. Another link-based technique is disclosed in Bellcore Special Report SR-NWT-002514.

In a conventional single-prong distributed network restoration techniques, one node, called the "sender", broadcasts network restoration messages. The other node in the pair connected to the failed link, called the "chooser", receives the restoration messages by various paths and "chooses" the best path for restoration. A typical method for determining the best path is to select the path having the lowest "hopcount", that is, the fewest intervening nodes and/or links.

The primary disadvantage of link-based distributed network restoration techniques is their inability to handle a node failure (where a node fails) or an area failure (where multiple links and/or nodes fail). For example, when a node fails, all links radiating from that node also fail as a result. According to linkbased distributed network restoration techniques, the nodes adjacent to the failed node will attempt to contact the failed node in order to find an alternate path to the failed node. However, the failed node will not respond and thus the restoration attempt is doomed to failure. For the same reasons, link-based distributed network restoration approaches cannot handle an area failure.

An extension of the link-based approach is disclosed by Komine et al. in "A Distributed Restoration Algorithm For Multiple-link And Node Failures Of Transport Networks," Proc. IEEE GLOBECOM '90, pp. 459–463, 1990. According to this method, hereinafter called "the KCOMS algorithm", a sender node broadcasts restoration messages not only to the chooser node, but also to those nodes that are adjacent to the chooser node. For this reason, this technique is often called a "two-hop" technique. Two-hop techniques can handle single-mode and double-link failures, but cannot handle area failures. Another disadvantage of the two-hop technique is that each node must maintain a restoration database including all nodes that are two hops away; further, each restoration message must include data reflecting the two-hop paths. Also for this reason, it is impractical to extend the two-hop technique to an n-hop technique. Such an extension would require very large restoration databases and restoration messages. A technique similar to the KCOMS algorithm is disclosed in Bellcore Special Report SR-NWT-002514 (hereinafter referred to as "the Bellcore report").

In contrast to link-based distributed network restoration approaches, path-based approaches are directed to restoring the entire path, rather than just the failed links and nodes. One such approach is disclosed in the Bellcore report. According to that approach, one of the end nodes initiates restoration requests on a unit lost channel basis; that is, the node issues a separate restoration message for each link that has failed. The primary disadvantage of this approach is that the proliferation of numerous restoration messages consumes network bandwidth and node resources.

Many distributed network restoration approaches, including the KCOMS algorithm, employ a technique known as "aggressive bandwidth reservation." According to this technique, the restoration process reserves more bandwidth than is necessary. Further, many distributed network restoration approaches indiscriminately flood the network with restoration messages. The primary disadvantage of these techniques is that they unnecessarily consume network bandwidth.

What is needed, therefore, is a single-prong path-based distributed network restoration method that employs selective message rebroadcasting and conservative bandwidth reservation.

SUMMARY OF THE INVENTION

The present invention is a system and method for restoring a disrupted path in a telecommunications network using conservative bandwidth reservation and selective message rebroadcast. A path connects a source node to a destination node via at least one tandem node. The nodes are interconnected by spans, wherein each span connects two nodes and comprises at least one link; the links are either working links, bearing network traffic, or spare links.

The method begins with informing the source and destination nodes of the path ID and bandwidth of the disrupted path. The source node then broadcasts a PACK message along all spans having spare links; the PACK message includes path ID and bandwidth of the disrupted path. Each tandem node selectively rebroadcasts the PACK message based on the number of times it has received the PACK message.

When a tandem node receives the first copy of a PACK message, it rebroadcasts the message along every span but the one on which it was received. When a tandem node receives the second copy of a PACK message, it sends it only along the span on which the first copy was received. Third and further copies of a PACK message are not rebroadcast.

When the destination node receives a PACK message along a span, it replies with an ACK message in order to conservatively reserve bandwidth on that span for a restoration path. When a tandem node receives a PACK message, it forwards the message along the restoration path indicated by the ACK message for the same purpose.

When the source node receives an ACK message, it sends out a CONF message along the restoration path; as each tandem node forwards the CONF message, it connects spare links in accordance with the message in order to form the restoration path. When the CONF message reaches the destination node, the disrupted communications path has been restored. Therefore, the destination node broadcasts a PDONE message which releases all of the network resources that were allocated to the restoration of the disrupted path.

One advantage of the present invention is that it limits restoration message traffic volume by selectively rebroadcasting restoration messages.

Another advantage of the present invention is that, through conservative bandwidth reservation, the present invention reserves only the bandwidth necessary to restore the disrupted path.

Another advantage of the present invention is that it permits the restoration process to retry spans should bandwidth become available on those spans, while providing a mechanism to rapidly select a span that has not yet been tried, regardless of its hopcount value.

Further features and advantages of the present invention as well as the structure and operation of various embodiments of the present invention are described in detail below with reference to the accompanying drawings. In the drawings, like reference numbers indicate identical or functionally similar elements. Additionally, the left-most digits of a reference number identify the drawing in which the reference number first appears.

BRIEF DESCRIPTION OF THE FIGURES

The present invention will be described with reference to the accompanying drawings, wherein.

DETAILED DESCRIPTION OF THE PREFERRED EMBODIMENTS

A communications network serves to transport information among a number of locations. The information to be transported is usually presented to the network in the form of time-domain electrical signals and may represent any combination of telephony, video, or computer data in a variety of formats. To transport such information, a typical communications network creates a "path" consisting of various physical sites, or "nodes," and information conduits, called "links," that interconnect the nodes. Each link serves to carry information from one node to another node. Each node may contain equipment for combining, separating, transforming, conditioning, and routing the information signals.

Figure 1:
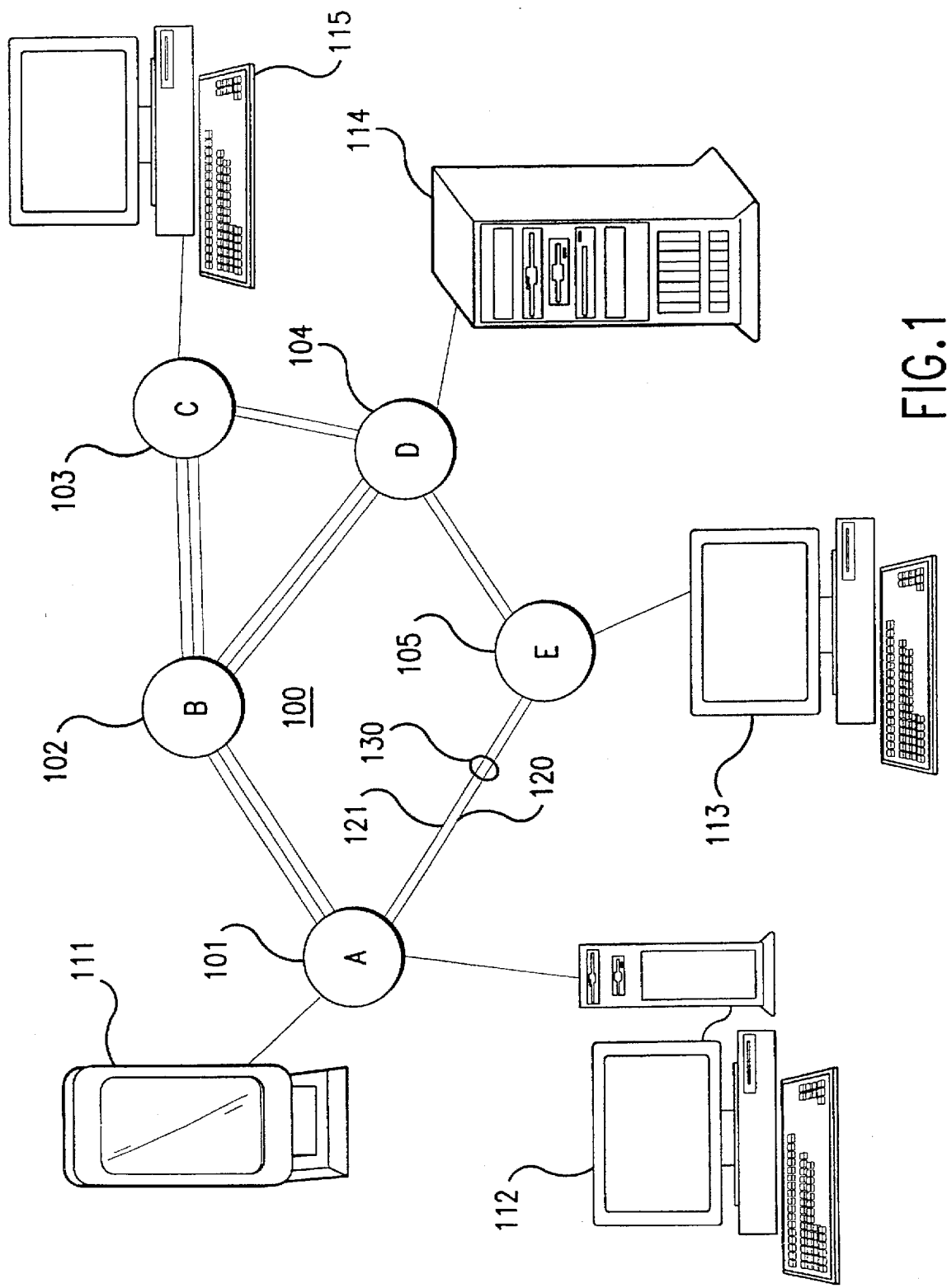
FIG. 1 shows a typical communications network 100.

FIG. 1 shows a typical communications network 100 consisting of nodes 101–105 connected by links 120–121. The communications system 100 routes data so as to effectively interconnect data equipment 111–115 that are located at a distance from one another. This routing is accomplished within the network by the ability of each node 101 to perform a one-of-many switching function, that is, to accept data entering along one link and send the data out along a different link. Under normal circumstances, the switching within each node is directed by some overall network routing logic commonly understood by those skilled in the art.

An example of a typical commercially available switch that can serve as a node 101 is the Model 1633-SX Digital CrossConnect Switch manufactured by Alcatel Network Systems. Some other equivalent or analogous switching apparatus may be used in a network to which the present invention is applied without altering the spirit and scope of the present inventive concept.

One or more links that connect two nodes are collectively referred to as a "span." For example, nodes 101 and 105 in FIG. 1 are shown to be connected by span 130 comprising links 120 and 121. Nodes are often connected by a multiplicity of parallel links due to the need for capacity. In addition, redundant spare links are commonly added between nodes with the intent that they usually carry no data traffic but may be used as alternate routes in the event of partial network failure. This spare link capacity, coupled with the switching ability within the network nodes, allows the network to use rerouting to recover from partial failures by circumventing the failed network elements. The specific logic and protocol applied in making switching decisions to accomplish this rerouting is the realm of the present invention.

Figure 2:
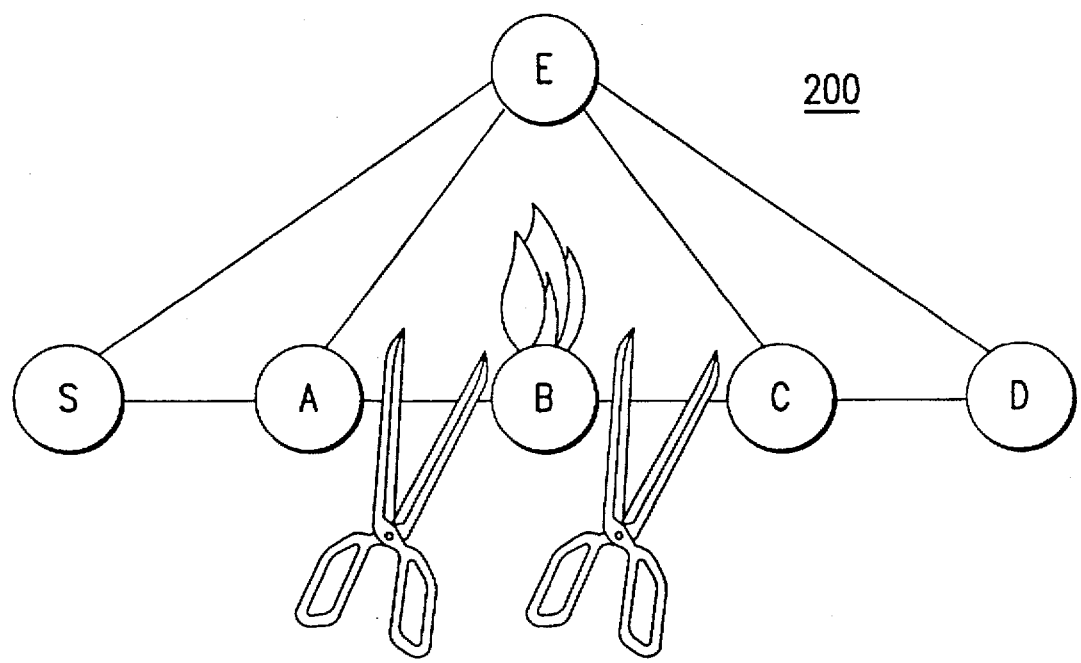
FIG. 2 depicts an exemplary network 200.

The operation of the present invention will be described in five phases: notification, broadcast, path trace-out, confirmation and cleanup. FIG. 2 depicts an exemplary network 200 that will be used to describe the operation of the present invention. Network 200 comprises nodes A, B, C, D, E, and S. Network 200 provides a path S-A-B-C-D from source node S to destination node D via nodes A, B, and C and spans S-A, A-B, B-C, and C-D. Source node S is the node at which path S-A-B-C-D originates; destination node D is the node at which path S-A-B-C-D terminates. Intermediate nodes A, B, and C are referred to as tandem nodes with respect to path S-A-B-C-D. Network 200 also comprises spans S-E, A-E, C-E and D-E, which may be used to provide alternate paths between nodes S and D in the event of a network failure.

Each path has a unique identifier, called a "path ID." In this example, the path ID for path S-A-B-C-D is Path ID=1. Each path also consumes a certain amount of bandwidth. For the purposes of discussion, bandwidth will be measured in terms of the number of links required. In this example, path 1 requires 5 links in each span in the path; thus, path 1 has a bandwidth of 5. Of course, bandwidth can be measured in other ways, as would be apparent to one skilled in the relevant art.

Figure 3:
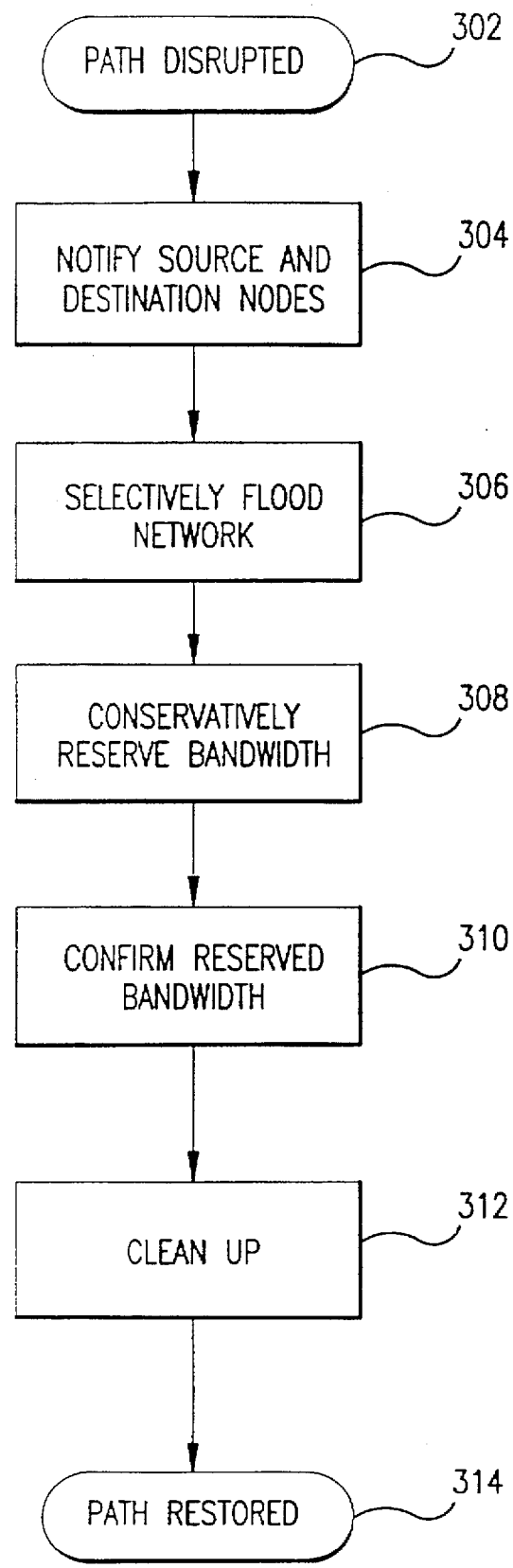
FIG. 3 is a high-level flowchart depicting the operation of a preferred embodiment of the present invention.

FIG. 3 is a high-level flowchart depicting the operation of a preferred embodiment of the present invention. When a path is disrupted, as shown in a step 302, network 200 notifies the path's source and destination nodes of the failure, as shown in a step 304; this is the notification phase of the present invention. When the path's source node has been notified of the failure, it selectively floods network 200 with forward restoration messages, as shown in a step 306; this is the broadcast phase of the present invention. When the path's destination node has received some or all of the forward restoration messages, it initiates the creation of restoration paths to the path's source node through conservative bandwidth reservation, as shown in a step 308; this is the path traceout phase of the present invention. Once the required bandwidth has been reserved, the path's source node initiates confirmation of the reserved bandwidth, as shown in a step 310; this is the confirmation phase of the present invention. Finally, network resources that were allocated to the restoration of the disrupted path are released, as shown in a step 312; this is the cleanup phase of the present invention. At this point, the disrupted path between the source and destination nodes has been restored, as shown in a step 314. Now the operation of the each of these phases will be described in detail.

The notification phase begins with the failure of a path. For example, in FIG. 2, path 1 has failed as a result of the failure of node B, as indicated by the flames emanating from node B. As a result, the spans adjacent to node B have also failed, as shown by the scissors superimposed over spans A-B and B-C in FIG. 2.

Figure 4:
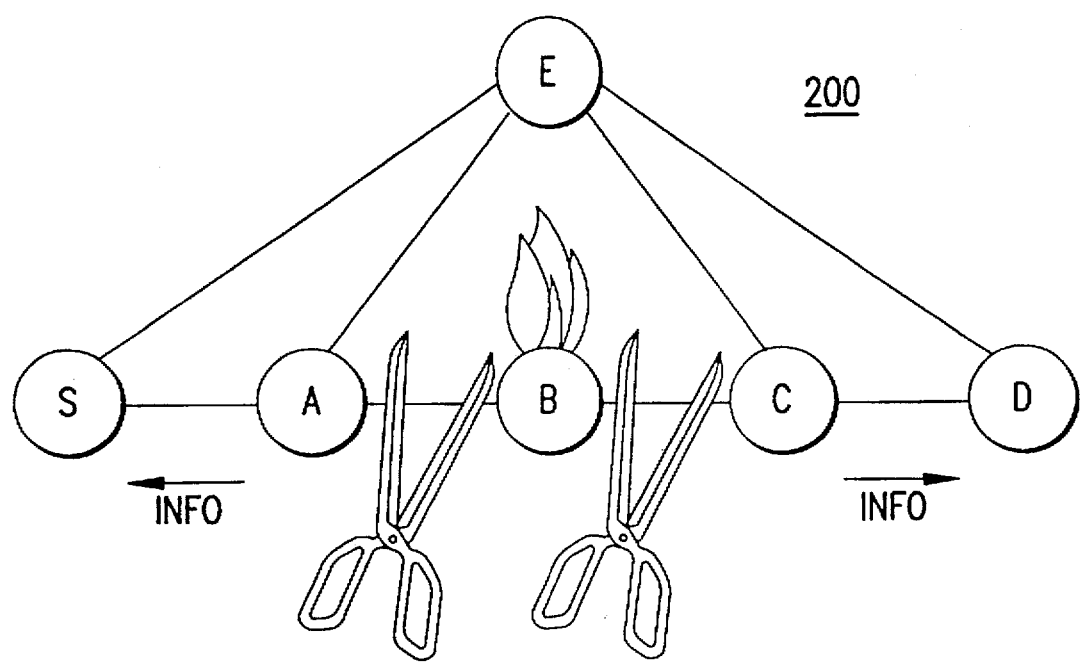
FIG. 4 depicts the notification phase of the operation of the present invention for network 200.

When a tandem node detects a link failure, it sends an INFO message to the end node of the disrupted path. Thus, as shown in FIG. 4, node A sends an INFO message to node S and node C sends an INFO message to node D. The INFO messages contain the path ID (here, Path ID=1) and bandwidth of the disrupted path (here, BW=5).

Because one node may simultaneously act as a conduit for more than one path originating at a source node, or terminating at a destination node, a node failure may cause more than one path to fail. In a preferred embodiment of the present invention, each tandem node consolidates information regarding disrupted paths originating at a particular source node, or terminating at a particular destination node, before sending or relaying an INFO message. This consolidation of information reduces the amount of restoration message traffic. In a preferred embodiment of the present invention, a tandem node receiving an INFO message releases the bandwidth on the working links of the disrupted path, freeing the bandwidth for use in other paths.

Broadcast Phase

Figure 5:
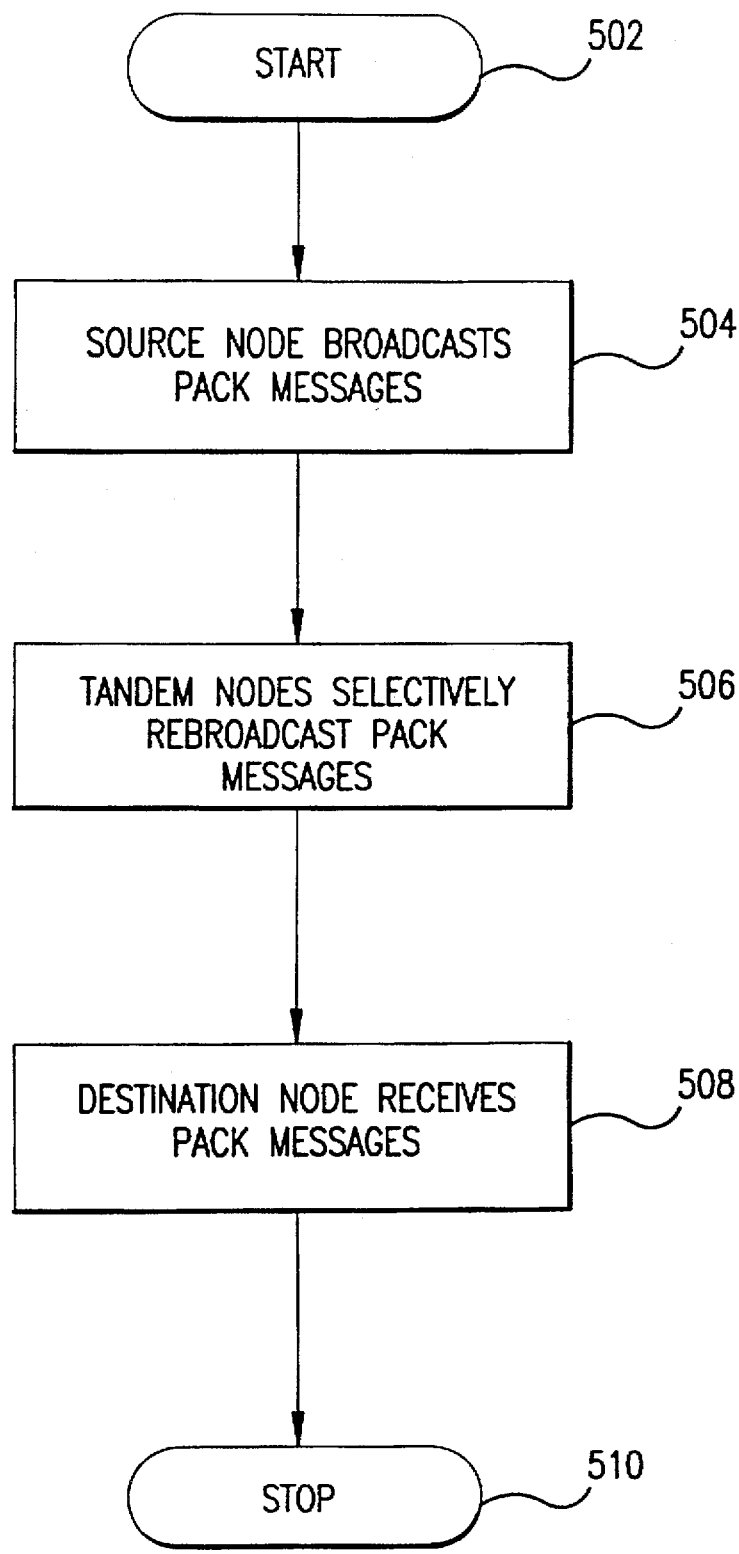
FIG. 5 is a flowchart depicting the broadcast phase of the operation of the present invention.
Figure 6:
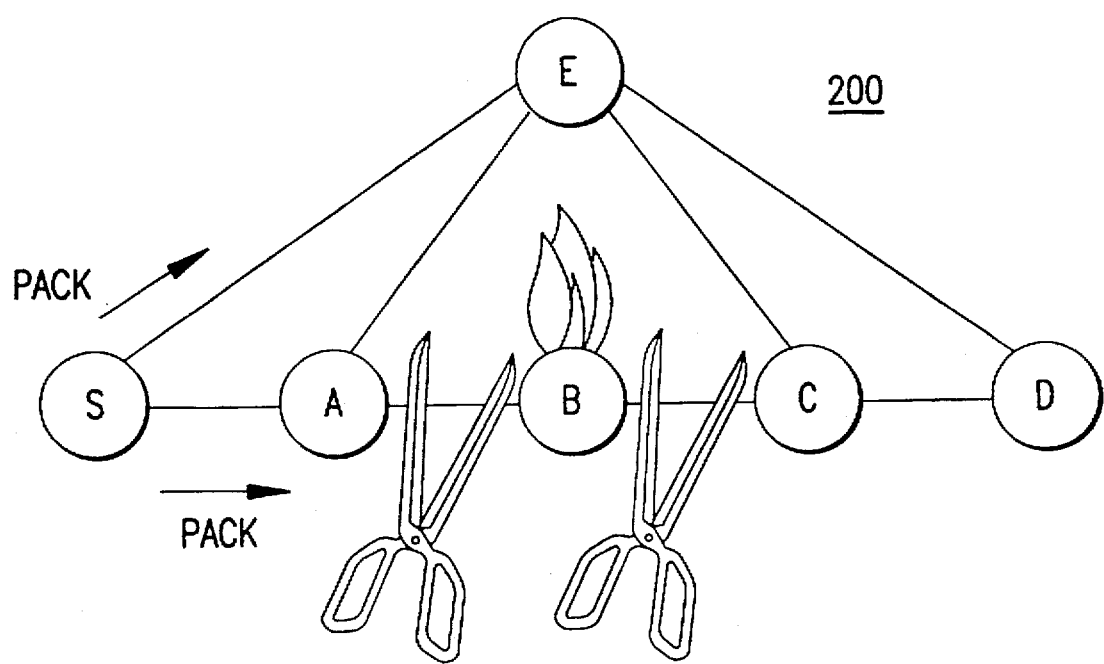
FIGS. 6, 8, and 9 depict the operation of the broadcast phase of the present invention for network 200.

The broadcast phase of the present invention begins when a source node receives an INFO message. FIG. 5 is a flowchart depicting the broadcast phase of the operation of the present invention. In a step 502, a source node has received an INFO message. In response, the source node broadcasts forward restoration messages called "PACK" messages along each of its spans. For example, when node S receives the INFO message sent by node A, it broadcasts PACK messages along spans S-E and S-A, as depicted in FIG. 6 and shown in a step 504.

Each PACK message includes information regarding all of the disrupted paths that originate at the source node. Each PACK message also includes a hopcount field which is incremented as the PACK message traverses the network to reflect the number of spans traversed. In a preferred embodiment of the present invention, when the hop-count value of a PACK message exceeds a predetermined hop-count limit, the PACK message is discarded; in this way, the volume of restoration traffic is limited. The hop-count limit is determined by various factors as would be apparent to one skilled in the relevant art.

When tandem nodes receive PACK messages, they selectively rebroadcast them, as shown in a step 506. This selective rebroadcasting feature of the present invention is described in detail below. Finally, destination node D receives some or all of the PACK messages via various network paths as shown in a step 508.

Figure 7:
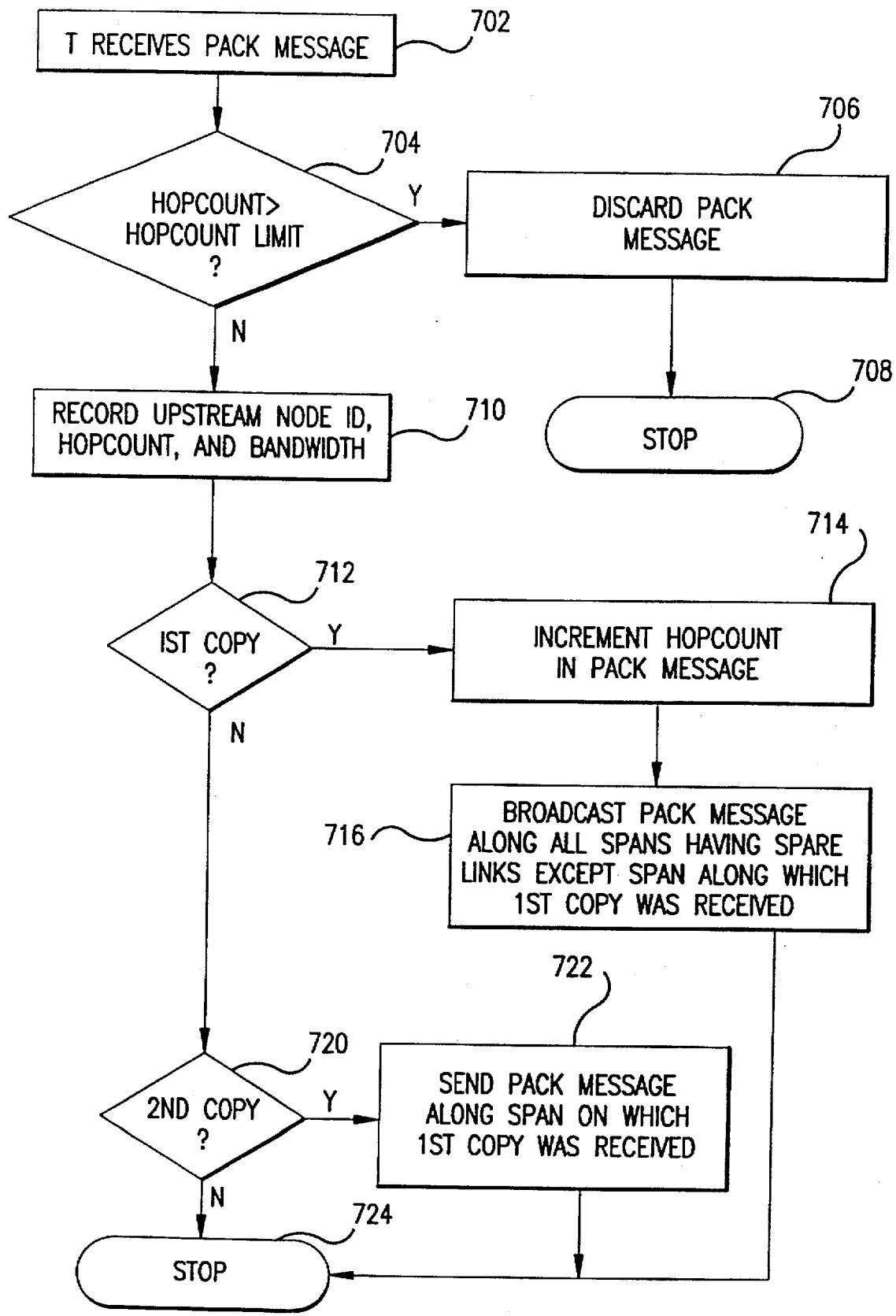
FIG. 7 is a flowchart depicting the operation of the selective rebroadcasting feature of the present invention.

FIG. 7 is a flowchart depicting the operation of the selective rebroadcasting feature of the present invention. Selective rebroadcasting of PACK messages takes place at each tandem node that receives a PACK message. When a tandem node receives a PACK message, as shown in a step 702, the value in the hop-count field is compared to the hop-count limit, as shown in a step 704. If the hop-count of the PACK message exceeds the hop-count limit, then the tandem node discards the PACK message, as shown in a step 706. As discussed above, this serves to limit the proliferation of restoration messages in the network.

Each node in the network contains a restoration table for maintaining data regarding the restoration status of network 200. The restoration table for node E of network 200 is presented as Table 1 below. In a preferred embodiment of the present invention, the restoration table has ten columns and a row for each restoration path traversing the node. The first column, labeled "Path ID," contains the path ID; in the present example, Path ID=1. The second column, labeled "UP," contains the identity of the "upstream" node in a potential restoration path; the "upstream" node is the adjacent node in the path in the direction of the source node. The third column, labeled "HOP," contains the number of hops (that is, the number of spans) between the node and the source node. The fourth column, labeled "BW," contains the bandwidth available on the upstream span. The function of the remaining columns will be discussed below.

TABLE 1

| Path ID | UP | HOP | BW | DOWN | ACKHOP | Status | Part | Msg_Send | Msg_Recv |
|---------|----|-----|----|------|--------|--------|------|----------|----------|
| 1 | S | 1 | 5 | | | 0 | M | 0 | 0 |
| 1 | A | 2 | 5 | | | 0 | M | 0 | 0 |

Referring again to FIG. 7, if the hop-count of the PACK message does not exceed the hop-count limit, then the tandem node records the bandwidth requested, the identity of the upstream node and the hop-count to the source node, as shown in a step 710. The tandem node then rebroadcasts the PACK message based on the number of copies of the PACK message that the tandem node has received. Tandem nodes keep track of the number of copies using a counter or other similar means, as would be apparent to one skilled in the relevant art.

When a tandem node receives the first copy of a PACK message, as indicated by the "Y" branch from step 712, the tandem node first increments the hop-count in the message, as shown in a step 714, and then broadcasts the modified message along all spans having spare links, except the span along which the first copy of the pack message was received, as shown in a step 716.

Figure 8:
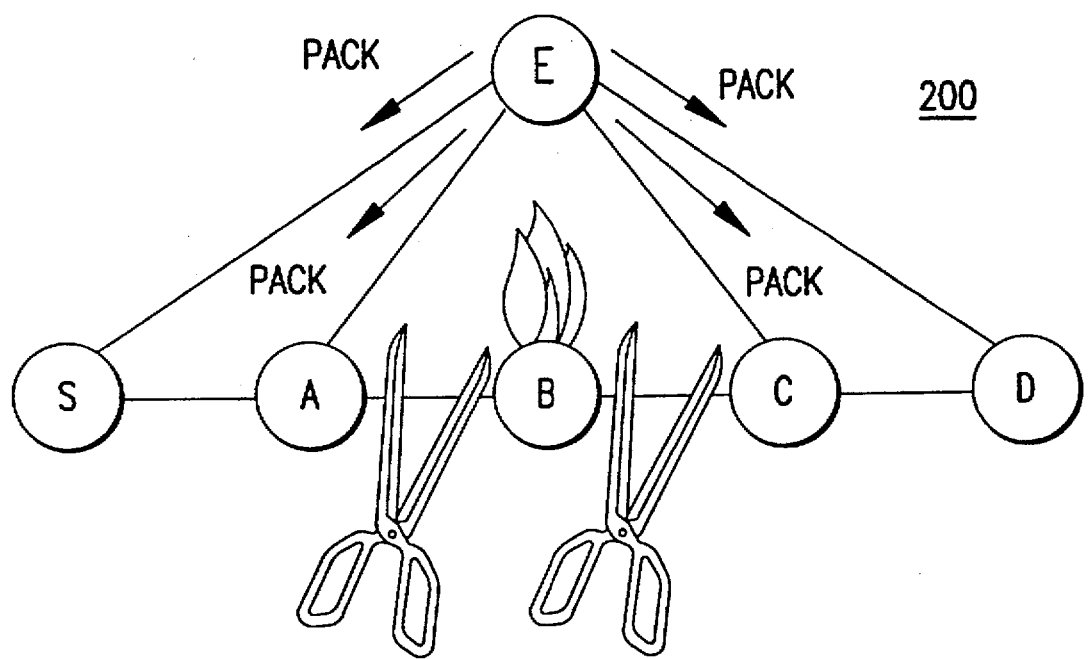

For example, assume that tandem node E in network 200 receives the first copy of the PACK message for the restoration of path 1 from source node S, as shown in FIG. 8. Node E then creates a row in its restoration table (the first row of Table 1) and records the identity of the disrupted path (Path ID=1), the identity of the upstream node (UP=S), the hop-count value to the source node (HOP=1), and the bandwidth required to restore the disrupted path (BW=5). Tandem node E then increments the hop-count in the PACK message to 2 and broadcasts the modified message along spans E-A, E-C, and E-D, as shown in FIG. 8.

When a tandem node receives the second copy of a PACK message, as indicated by the "Y" branch from step 720, the tandem node will send the PACK message only along the span on which the first copy of the PACK message was received, as shown in a step 722. The inventors have found that by informing the sending node of the first copy of the PACK message of the potential route through the sending node of the second copy of the PACK message, more effective network restoration is achieved.

Figure 9:
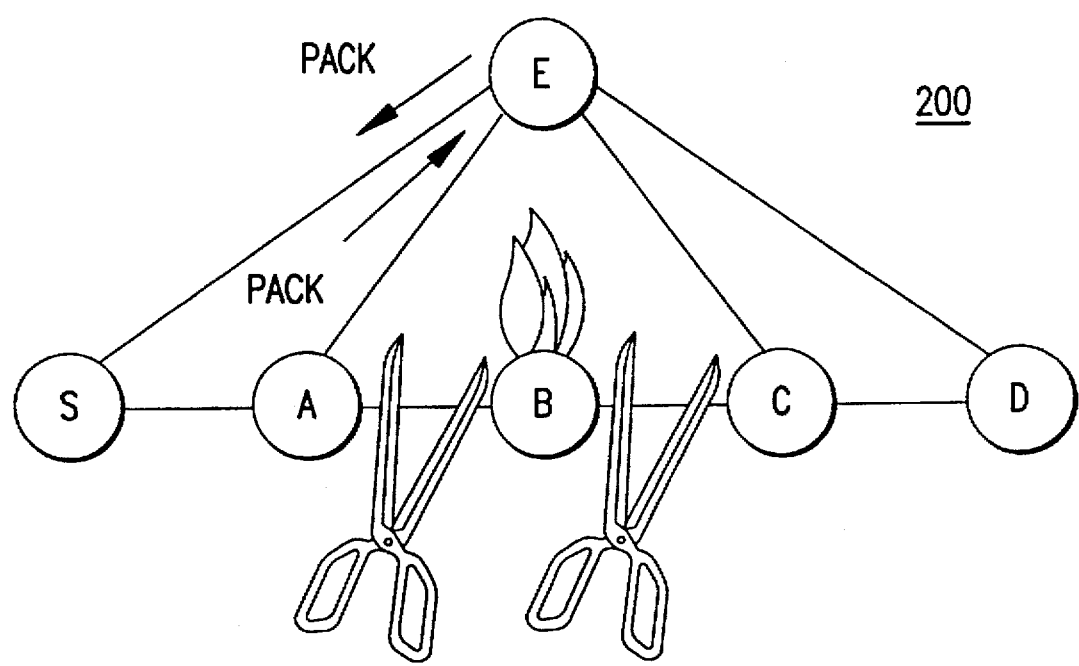

Referring to FIG. 9, for example, when tandem node E receives a second copy of the PACK message for path 1 from node A, tandem node E rebroadcasts the pack message only along span S-E to node S. Tandem node E also creates a new row in its restoration table (the second row of Table 1) describing the potential restoration path via node A. For this path, Path ID=1, UP=A, HOP=2, and BW=5.

The restoration table also contains a column labeled "Part" describing the part the node plays in the restoration process. In the restoration of path 1, node E plays the part of a tandem node, and so Part=M in each row where Path ID=1. Because node E may play different parts in the restoration of other paths simultaneously, rows associated with other paths may have different Part values. For example, if node E plays the role of a source node in the restoration of another path, then Part=S for that path; if node E plays the role of destination node, then Part=D for that path.

When a tandem node receives third or further copies of the PACK message for a path, it does not rebroadcast them. This serves to limit the volume of restoration message traffic, as described above.

Path Trace-out Phase

Figure 10:
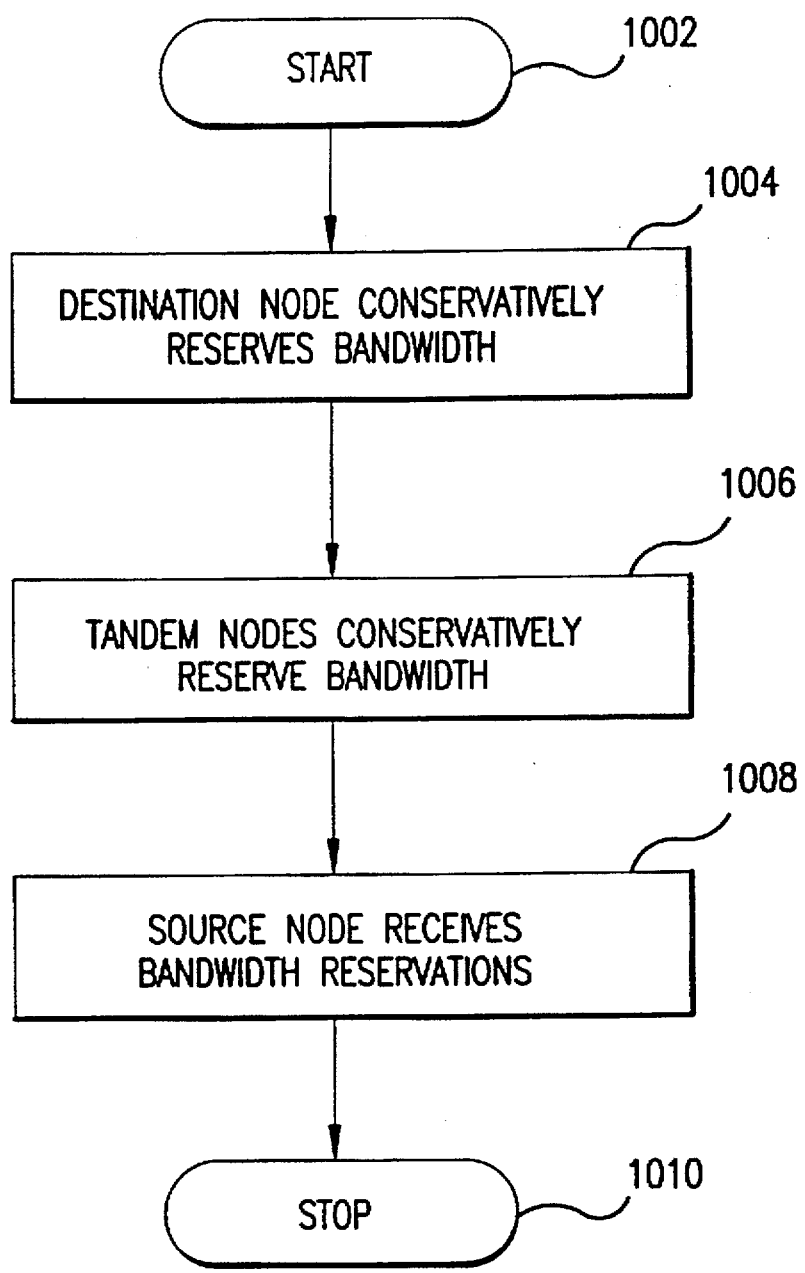
FIG. 10 is a flowchart depicting the operation of the path trace-out phase of the present invention.

FIG. 10 is a flowchart depicting the operation of the path trace-out phase of the present invention. The path trace-out phase embodies the conservative bandwidth reservation feature of the present invention. Path trace-out is initiated by the destination node, which conservatively reserves bandwidth along restoration paths indicated by received PACK messages, as shown in a step 1004. This process is repeated by each tandem node in each restoration path, as shown in a step 1006, until each restoration path is traced-out to the source node, as shown in a step 1008.

Figure 12:
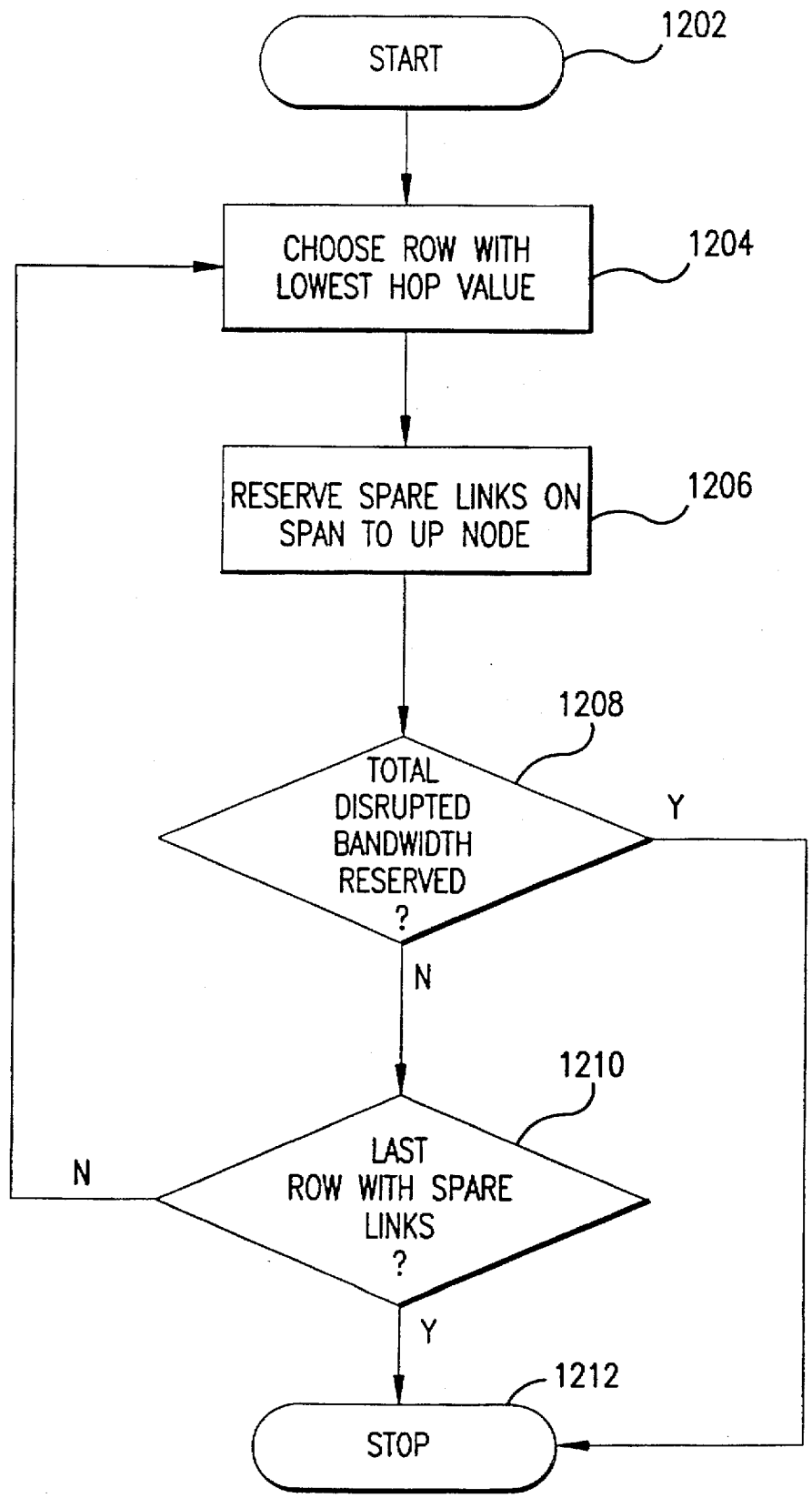
FIG. 12 is a flowchart depicting the operation of the conservative bandwidth reservation feature of the present invention.

FIG. 12 is a flowchart depicting the conservative bandwidth reservation method employed by the destination node in step 1004 and the tandem nodes in step 1006. To conservatively reserve bandwidth, a node chooses the row in its restoration table that has spare links and the lowest hop-count to the source node, as shown in a step 1204. The node then reserves spare links on the span connected to the upstream node for the row, up to the number required to restore the disrupted path, as shown in a step 1206. If the total disrupted bandwidth id thereby reserved, as indicated by the "Y" branch from step 1208, then conservative bandwidth reservation is complete for the node, as shown in a step 1212. If the span does not possess sufficient bandwidth to completely restore the bandwidth of the disrupted path, then the node examines its restoration table for other rows with spare links. If there are none, as indicated by the "Y" branch from step 1210, then conservative bandwidth reservation is complete for the node. However, if the node finds other rows with spare links, it repeats the conservative bandwidth reservation process for the row in its restoration table having the next lowest hop-count to the source node, as indicated by the "N" branch from step 1210.

Figure 11:
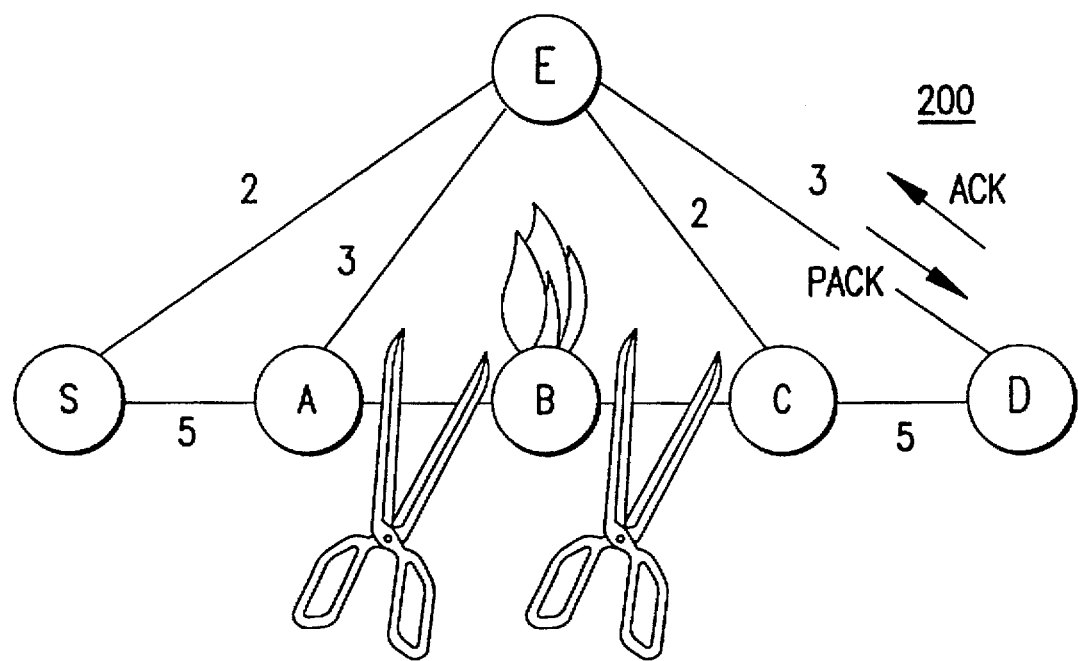
FIGS. 11, 13, and 14 depict the operation of the path trace-out phase of the present invention for network 200.
Figure 13:
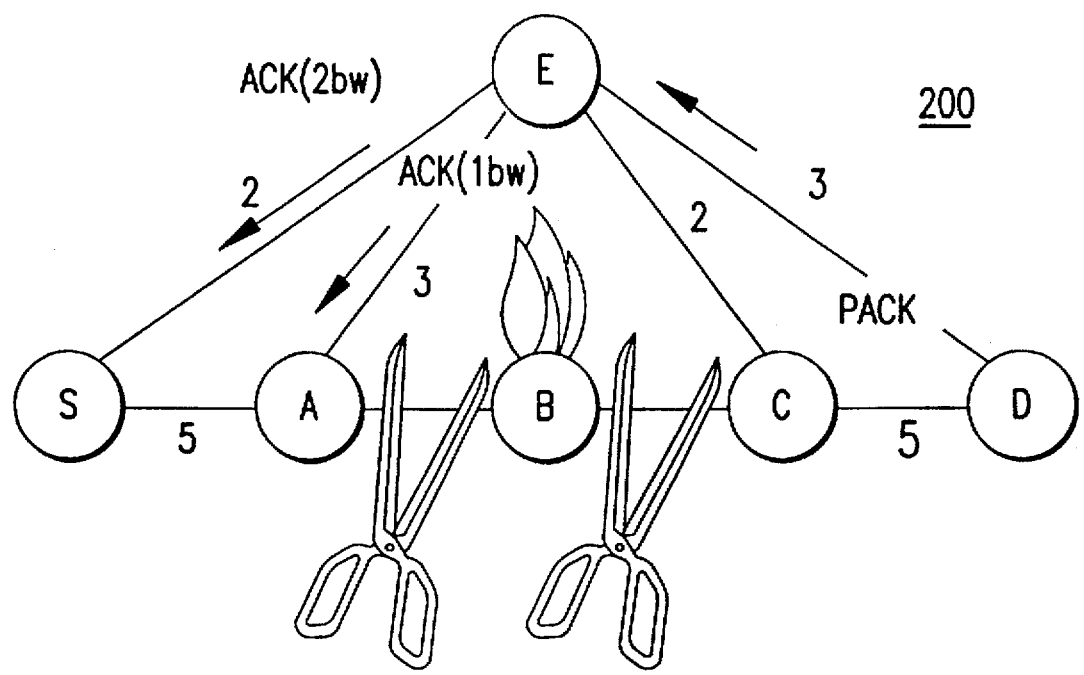
Figure 14:
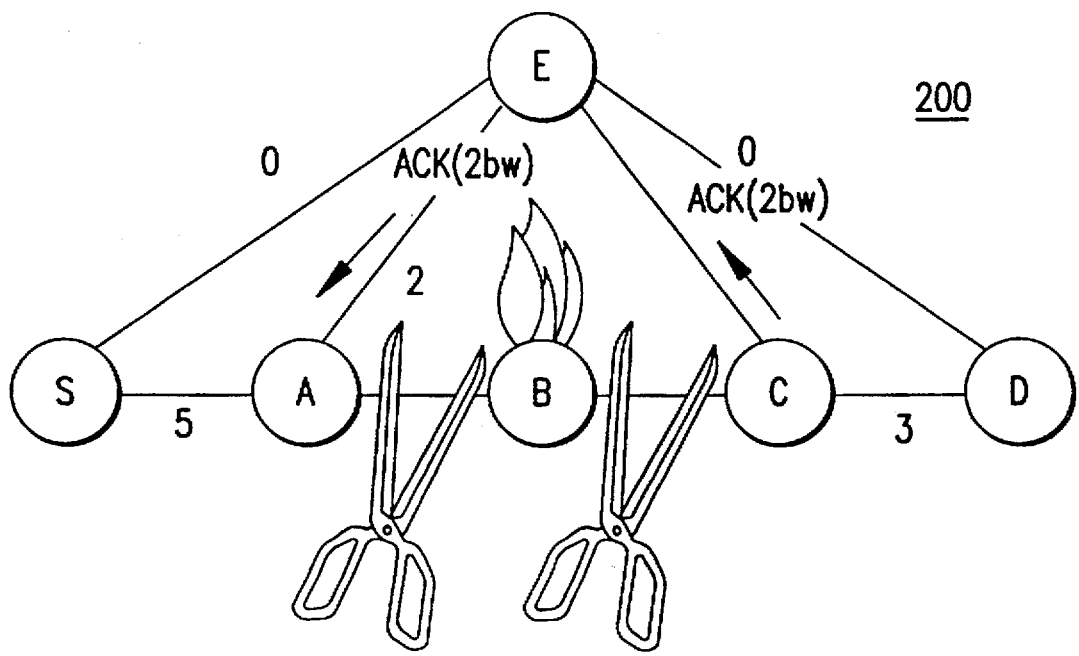

FIGS. 11, 13, and 14 depict the operation of the path trace-out phase for network 200. FIG. 11 depicts the initiation of the path trace-out phase by destination node D. FIG. 11 also indicates the number of spare links available on each span; for example, span S-E has 2 spare links. Also, because spans S-A and C-D have released the links formerly comprising path 1 (which occupied 5 links on each span), spans S-A and C-D now each have 5 spare links.

Node D initiates the path trace-out phase by selecting the upstream span in a restoration path having the lowest hop-count to source node S. In network 200, that span is span E-D, which has a spare bandwidth of BW=3. A node conservatively reserves bandwidth on a span by sending reverse restoration messages called "ACK" messages along that span. Therefore, destination node D transmits an ACK message along span E-D reserving that bandwidth, as shown in FIG. 11. Because destination node D has not reserved sufficient bandwidth to restore path 1, it then selects span C-D which has a bandwidth of BW=5. Destination node D transmits an ACK message along span C-D to reserve two links, thus meeting its requirement for five links for the restoration of path 1. Node C then relays the ACK message along span C-E thus reserving the two spare links on that span.

FIGS. 13 and 14 illustrate conservative bandwidth reservation by tandem node E in network 200. When node D received the PACK message from node E, it recognized that a potential path existed with HOP=2 via node E. Node D therefore sends an ACK message with BW=3 to node E, thereby reserving three spares on Link D-E, and indicates in its restoration table that it still requires restoration paths with bandwidth BW=2 to achieve full restoration of path 1.

FIG. 13 shows the processing, by node E, of the ACK message received from node D. When node E receives the ACK message from Node D requesting BW=3 to restore path 1, node E examines its restoration table (see Table 1) for any row that is related to path 1 and finds there are two rows indicating two potential restoration paths to node S. The first row of Table 1 indicates a potential restoration path with HOP=1; the second row indicates a potential restoration path via node A with HOP=2. Node E chooses the span with the shorter path (that is, with the lower HOP value), span S-E. Because span S-E has only two spare links, and the ACK message received from node D requires three spare links, node E sends an ACK message along span S-E requesting both spare links, as shown in FIG. 13, and splits the corresponding restoration table row into two rows (the first and second rows of Table 2).

example, the first ACK message sent by node D, sent along span E-D, has msg#=1, and the second ACK message, sent along span D-C, has msg#=2.

Each restoration table contains two columns for tracking messages sent and received by the node for each row. The first column, labeled "Msg_Send," maintains the msg# of the message sent by the node for a particular row. For example, because node E has sent one ACK message, Msg_Send=1 in the row for that restoration path (the first row of Table 2). The second column, labeled "Msg_Recv," contains the msg# of the message received by the node for a particular row. For example, because the ACK message received by node E for this row (the first row of Table 2) had msg#=1, Msg_Recv=1. Nodes use the msg# field in each restoration message, and the Msg_Send and Msg_Recv columns in their restoration tables, to associate restoration messages with their corresponding restoration paths.

The other row (the second row of Table 2) resulting from the split indicates that no spare links remain on span E-S (BW=0).

Since the request for a total of three spare links is not satisfied, Node E searches its restoration table for the row having the next lowest HOP value; that row represents the potential restoration path, indicated by the third row of Table 2, having HOP=2 via node A. Node E reserves one spare link on span A-E by sending an ACK message with BW=1 along that span, as shown in FIG. 13, and splits the corresponding restoration table row into two rows (the third and fourth rows of Table 3). One row (the third row of Table 3) indicates that an ACK message has been sent (Status=ACKED) to node A (UP=A) for a restoration path having

TABLE 2

| Path ID | UP | HOP | BW | DOWN | ACKHOP | Status | Part | Msg_Send | Msg_Recv |
|---------|----|----|----|------|--------|--------|------|----------|----------|
| 1 | S | 1 | 2 | D | 1 | ACKED | M | 1 | 1 |
| 1 | S | 1 | 0 |   |   | 0 | M | 0 | 1 |
| 1 | A | 2 | 3 |   |   | 0 | M | 0 | 1 |

One of the rows (the first row of Table 2) indicates that an ACK message has been sent to node S with HOP=1 and BW=2. This row is also updated to reflect that the "downstream" node in the restoration path is node D (DOWN=D); the "downstream" node is the adjacent node in the path in the direction of the destination node. The restoration table also contains a column, labeled "Status," to track the status of the upstream span; because an ACK message has been sent along this span, the value for this row is Status=ACKED.

Each ACK message contains a msg# field to indicate the order in which it was sent by its originating node with respect to the other ACK messages sent by that node. For one link (BW=1) and two hops to node S (HOP=2); this row also indicates that this is the second ACK message that node E has sent (Msg_Send=2) in response to the first ACK message that node D sent (Msg_Recv=1), and that the downstream node in this restoration path is node D (DOWN=D).

TABLE 3

| Path ID | UP | HOP | BW | DOWN | ACKHOP | Status | Part | Msg_Send | Msg_Recv |
|---------|----|----|----|------|--------|--------|------|----------|----------|
| 1 | S | 1 | 2 | D | 1 | ACKED | M | 1 | 1 |
| 1 | S | 1 | 0 |   |   | 0 | M | 0 | 1 |
| 1 | A | 2 | 1 | D | 1 | ACKED | M | 2 | 1 |
| 1 | A | 2 | 2 |   |   | 0 | M | 0 | 1 |

To reduce restoration message volume and limit the length of the restoration path, each ACK message contains a ACKHOP field which indicates the hopcount to the destination node. A tandem node will not choose any span where the sum of the HOP value in the span's restoration table row and the ACKHOP value in the ACK message being processed exceeds the hop-count limit. The ACK message received from node D indicates that the destination node is one hop downstream (ACKHOP=1). Node E records this value in the rows in its restoration table corresponding to that ACK message (the first and third rows of Table 3).

To detect the possible looping of an ACK request, each ACK message includes a Trailer field which indicates the nodes that the ACK message has traversed. In processing an ACK message, a tandem node will not choose any span that leads to a node in the Trailer field of the ACK message.

The other row (the fourth row of Table 3) resulting from the split indicates that two spare links remain on span E-A (BW=2).

Note that the total bandwidth reserved by the ACK messages sent by Node E is limited to that requested by the ACK message received by Node E. This illustrates the conservative bandwidth reservation feature of the present invention.

FIG. 14 illustrates the processing of the ACK message received from node C. When node D received the PACK message from node C, it recognized that a potential path existed via node C with HOP=4 and BW=5. Because node D still requires two spare links for the complete restoration of path 1, node D sent an ACK message to node C with BW=2. When node C received the PACK message from node E, it recognized that a potential path existed with HOP=3 and BW=2 via node E. Because the ACK message received from node D requested two spare links, node C sends an ACK message to node E with BW=2, as shown in FIG. 14.

When node E receives the ACK message from node C, it examines its restoration table for the row having spare links with the lowest HOP value. Because span S-E now has no spare links (see the second row of Table 3), node E moves on to span A-E. Because span A-E has two spare links, node E sends an ACK message to node A with BW=2 to reserve them, as shown in FIG. 14, and splits the corresponding table row (the fourth row of Table 3) into two rows (the fourth and fifth rows of Table 4).

tion path is node C (DOWN=C), and that the destination node is two hops downstream (ACKHOP=2).

The other row (the fifth row of Table 4) resulting from the split indicates that no spare links remain on span E-A (BW=0).

Confirmation Phase

When the source node of a disrupted path receives an ACK message containing the disrupted path ID, it recognizes that a restoration path exists. In response, the source node sends a CONF message containing mapping information back to the destination node along the indicated restoration path. The mapping information includes, for example, the message number, the path ID, and the bandwidth for the restoration path on that span. The source node also connects the disrupted channels to the links in the downstream span indicated by the mapping information.

For example, for network 200, when node S receives the ACK message from node E with msg#=1 and BW=2, it responds by sending a CONF message to node E, also with msg#=1 and BW=2. Node S responds similarly for the other two ACK messages it receives.

When a tandem node receives a CONF message, it uses the msg# and Path ID fields in the CONF message to locate the corresponding row in the restoration table, updates the Status field from ACKED to CONF, and relays the CONF message downstream to the node indicated in the DOWN field of the table row.

Figure 15:
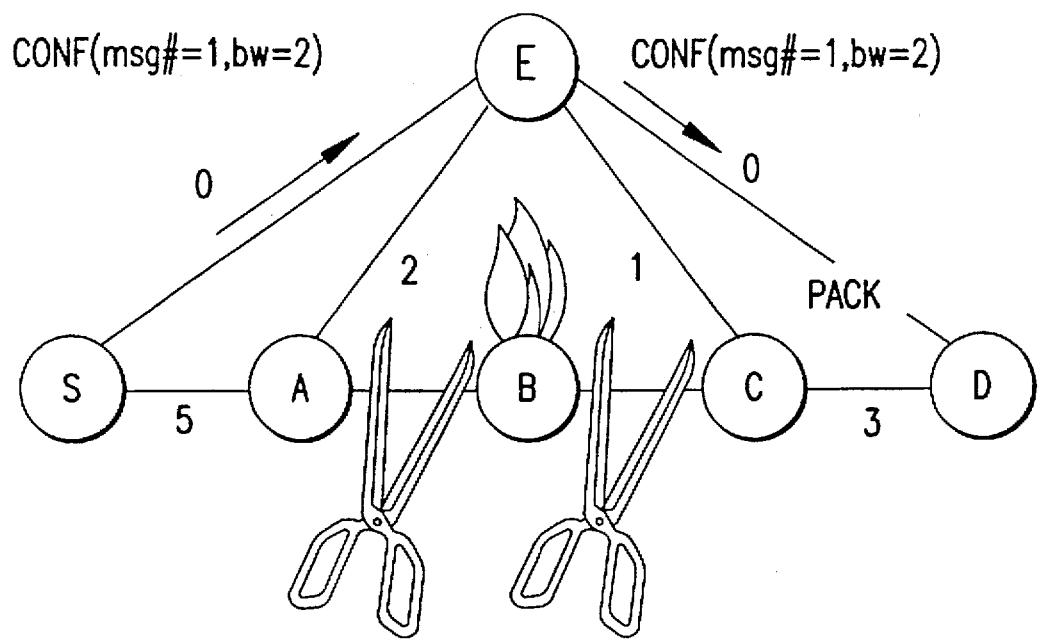
FIGS. 15 and 16 depict the confirmation phase of the present invention for network 200.

FIG. 15 illustrates the processing of the first CONF message by node E; node E receives this CONF message from node S. Referring to FIG. 15, the CONF message contains the fields path=1, msg#=1, and bw=2. Node E therefore finds the table row with Path ID=1, Status= ACKED and Msg_Send=1(the first row in Table 4). That row indicates that Node D is the downstream node and that the ACK message that caused the creation of the row had msg#=1 (indicated by the Msg_Recv field in that table row). Node E therefore sets the status field of the table row to

TABLE 4

| Path ID | UP | HOP | BW | DOWN | ACKHOP | Status | Part | Msg_Send | Msg_Recv |
|---|---|---|---|---|---|---|---|---|---|
| 1 | S | 1 | 2 | D | 1 | ACKED | M | 1 | 1 |
| 1 | S | 1 | 0 |   |   | 0 | M | 0 | 1 |
| 1 | A | 2 | 1 | D | 1 | ACKED | M | 2 | 1 |
| 1 | A | 2 | 2 | C | 2 | ACKED | M | 3 | 2 |
| 1 | A | 2 | 0 |   |   | 0 | M | 0 | 1 |

One row (the fourth row of Table 4) indicates that an ACK message has been sent (Status=ACKED) to node A (UP=A) for a restoration path having two links (BW=2) and two hops to the source node (HOP=2); this row also indicates that this is the third ACK message that node E has sent (Msg_Send= 3) in response to the second ACK message that node D sent (Msg_Recv=2), that the downstream node in this restora- Status=CONF, as shown in Table 5, and forwards the CONF message to Node D with msg#=1 and bw=2, as shown in FIG. 15. Finally, Node E connects two links in the upstream span (span S-E) to two links in the downstream span (span E-D), thereby routing the restoration path through node E. Node E processes the second CONF message in a similar fashion.

TABLE 5

| Path ID | UP | HOP | BW | DOWN | ACKHOP | Status | Part | Msg_Send | Msg_Recv |
|---|---|---|---|---|---|---|---|---|---|
| 1 | S | 1 | 2 | D | 1 | CONF | M | 1 | 1 |
| 1 | S | 1 | 0 |   |   | 0 | M | 0 | 1 |
| 1 | A | 2 | 1 | D | 1 | CONF | M | 2 | 1 |
| 1 | A | 2 | 2 | C | 2 | ACKED | M | 3 | 2 |
| 1 | A | 2 | 0 |   |   | 0 | M | 0 | 1 |

Figure 16:
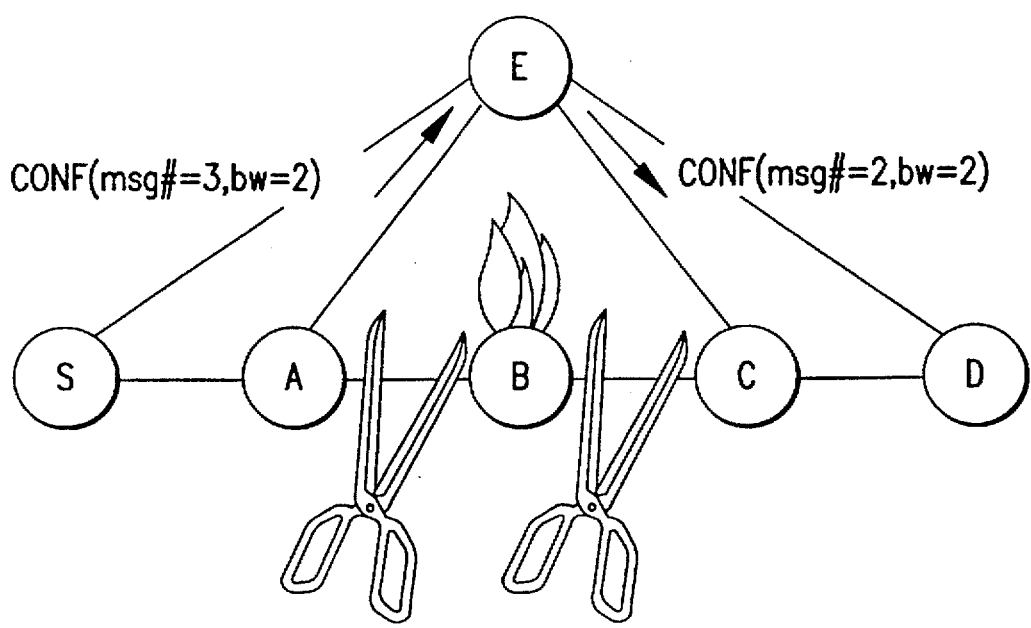

FIG. 16 illustrates the processing of the third CONF message by node E; node E receives this CONF message from node A. Referring to FIG. 16, the CONF message contains the fields path=1, msg#3, and bw=2. Node E therefore finds the table row with Path ID=1, Status=ACKED and Msg_Send=3 (the fourth row in Table 5). That row indicates that Node C is the downstream node and that the ACK message that caused the creation of the row had msg#=2 (indicated by the Msg_Recv field in the table row). Node E therefore sets the status field of the table row to Status=CONF, as shown in Table 6, and forwards the CONF message to Node C with msg#2 and bw=2, as shown in FIG. 16. Finally, Node E connects two links in the upstream span (span A-E) to two links in the downstream span (span E-C), thereby routing the restoration path through node E. As the CONF messages are processed by nodes A and C, those nodes connect upstream and downstream links together by similar processing.

TABLE 6

| Path ID | UP | HOP | BW | DOWN | ACKHOP | Status | Part | Msg_Send | Msg_Recv |
|---|---|---|---|---|---|---|---|---|---|
| 1 | S | 1 | 2 | D | 1 | CONF | M | 1 | 1 |
| 1 | S | 1 | 0 | | | 0 | M | 0 | 1 |
| 1 | A | 2 | 1 | D | 1 | CONF | M | 2 | 1 |
| 1 | A | 2 | 2 | C | 2 | CONF | M | 3 | 2 |
| 1 | A | 2 | 0 | | | 0 | M | 0 | 1 |

When a destination node receives a CONF message, it connects links in the upstream span to the disrupted channels according to the mapping information in the CONF message, thereby restoring the disrupted communications path. For example, when node D in network 200 receives the first CONF message from node E, it connects two links in span E-D to the disrupted channels in the communications path, thereby restoring path 1.

Clean-up

When the destination node receives a CONF message indicating that all of the lost bandwidth for a disrupted path has been restored, it broadcasts a PDONE message to indicate that the restoration for the disrupted path is complete. When a tandem node receives a PDONE message for a disrupted path, it releases all of the entries in its restoration table for that path, and terminates the broadcast of any PACK messages related to that path. In this manner, all of the network resources allocated to restoring a disrupted path are released as soon as the path is restored.

Concurrent Path Restoration

The conservative bandwidth request feature of the present invention allows multiple disrupted paths to be restored concurrently. The following example illustrates this aspect of conservative bandwidth reservation.

Figure 17:
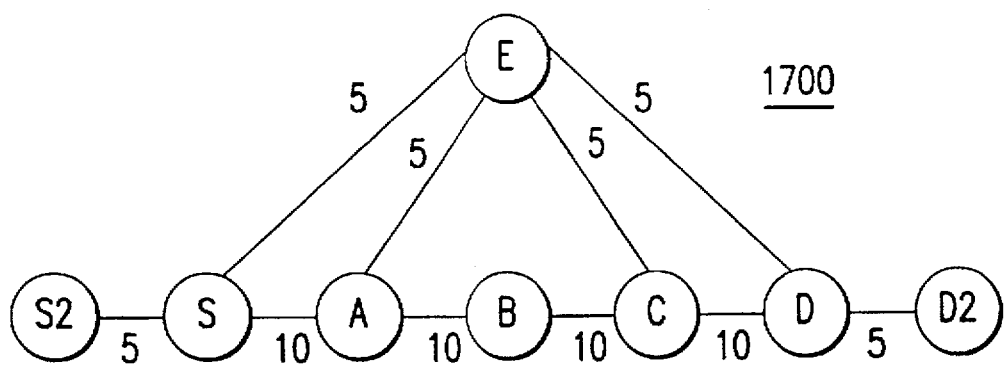
FIGS. 17, 18, 19 and 20 depict the operation of the present invention in concurrent path restoration.

FIG. 17 depicts a network 1700 having two paths. Path 1 (S-A-B-C-D) has a bandwidth of BW=5 and path 2 (S2-S-A-B-C-D-D2) also has a bandwidth of BW=5. Note that the two paths concurrently occupy spans S-A, A-B, B-C, and C-D, so that those spans devote a total bandwidth of BW=10 to the two paths.

Figure 18:
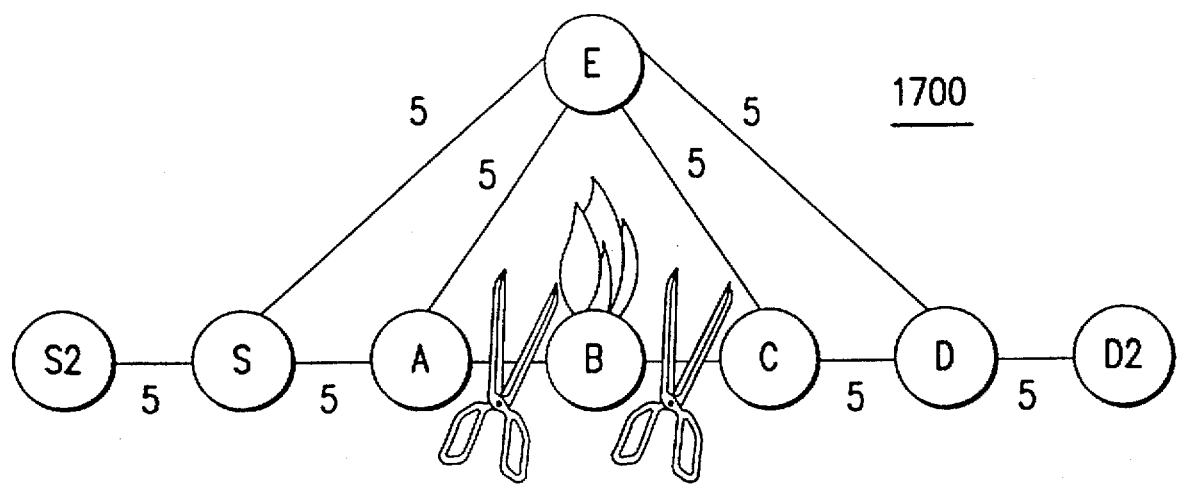

FIG. 18 depicts network 1700 after the failure of node B and spans A-B and B-C. Note that, in FIG. 18, some other process has reserved 5 links in each of spans S-A and C-D, so that only 5 spare links remain in each of those spans.

Figure 19:
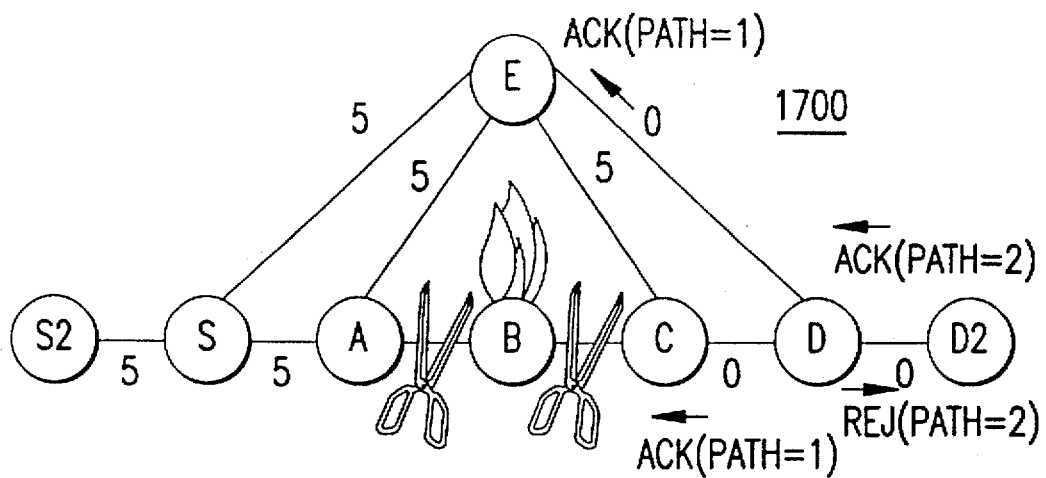

FIG. 19 depicts the operation of a conventional network restoration algorithm employing aggressive bandwidth reservation rather than the conservative bandwidth reservation of the present invention. Because node D is closer to node C, bandwidth reservation for path 1 will commence before bandwidth reservation commences for path 2. Under aggressive bandwidth reservation, each node reserves as many links as possible, up to the total restoration bandwidth required, on every span. Thus, because the restoration of path 1 requires BW=5, node D reserves the 5 spare links on span D-E and the 5 spare links on span D-C, as shown in FIG. 19. Therefore, when the ACK messages for path 2 arrive at node D, there are no spare links available, and the restoration of path 2 fails.

Figure 20:
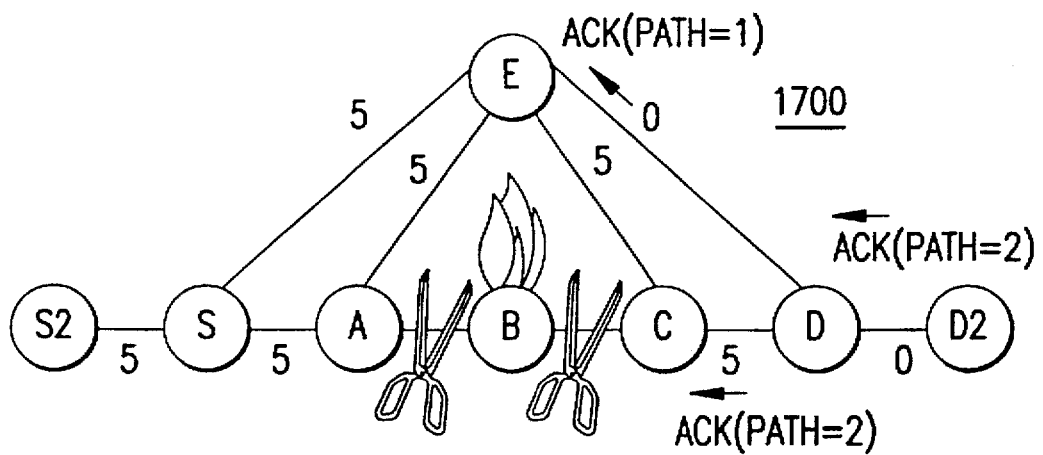

FIG. 20 depicts the operation of the conservative bandwidth reservation feature of the present invention in the same situation. When node D finds 5 spare links on span D-E, it reserves those links and no others, having reserved a sufficient number of links to restore path 1. Therefore, when the ACK messages for path 2 arrive at node D, there are 5 spare links on span D-C available, and the restoration of path 2 does not fail.

Adaptive Retry

During a restoration process, an ACK message may arrive at a tandem node having less spare bandwidth on its spans than the ACK message requires. When this happens, a conventional network restoration algorithm will cause the tandem node to send a REJ message to the node that sent the ACK message; the REJ message indicates the amount of bandwidth that could not be reserved.

However, because other restoration processes may be executing concurrently, the number of spare links available at a given node can change rapidly. Therefore, it is wise to retry each span at least once before sending a REJ message. Further, because new potential restoration paths may present themselves during the retry process, it is desirable to consider these paths before the retry process has run its course. The adaptive retry mechanism of the present invention provides both of these features.

Figure 21:
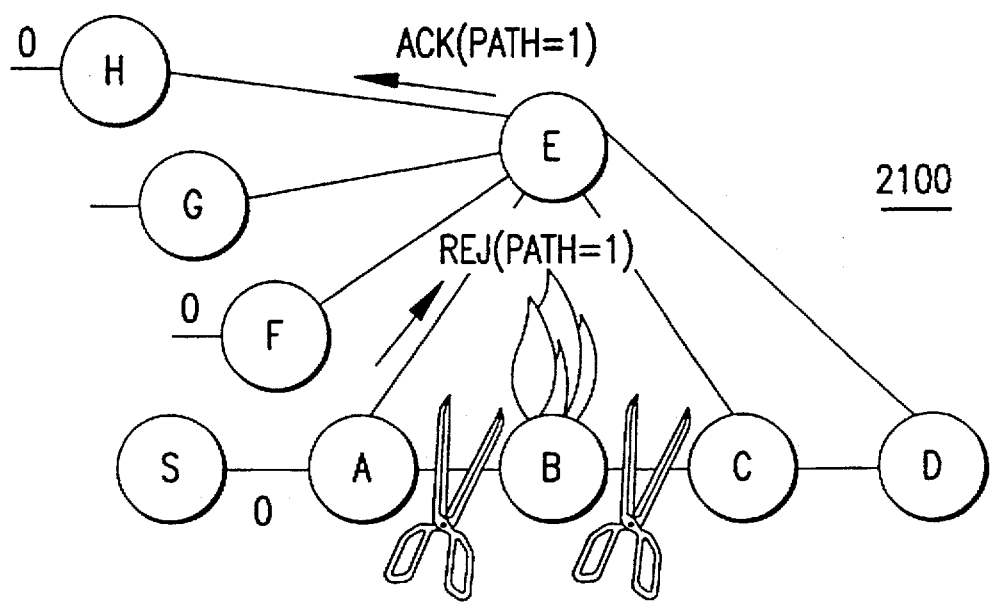
FIG. 21 depicts the adaptive retry feature of the present invention.

FIG. 21 depicts a network 2100 in which path 1 (S-A-B-C-D) having bandwidth BW=5 has been disrupted by the failure of node B and spans A-B and B-C. Node E has received PACK messages from nodes A, H and F, and has consequently created three rows in its restoration table, as shown in Table 7. Node E then receives an ACK message from node D, and therefore attempts to trace the path further towards its source node. Because the first row of the restoration table has the lowest HOP value (HOP=2), node E has sent an ACK message to node A having path=1, bw=5, and msg#=1. However, as indicated in FIG. 21, node A has no spare bandwidth on any other span. Therefore, node A replies with a REJ message having path=1, bw=5, and msg#=1.

TABLE 7

| Path | UP | Retry | HOP | BW | DOWN | ACKHOP | Status | Part | Msg_Send | Msg_Recv |
|------|----|----|-----|-----|------|--------|--------|------|----------|----------|
| 1 | A | 0 | 2 | 5 | D | 1 | ACKED | M | 1 | 1 |
| 1 | H | 0 | 3 | 5 | | | | | | |
| 1 | F | 0 | 5 | 5 | | | | | | |

Each restoration table has a column, labeled "Retry," for indicating the number of bandwidth reservation attempts that have been made for each row. When node E receives the REJ message from node A, it increments the retry value for that potential restoration path to Retry=1, and then looks for the row having Retry=0 and the next lowest HOP value. Because that row is the row for node H (the second row in table 7, having HOP=3), node E transfers the data for this reservation attempt (DOWN=D, ACKHOP=1, Status= ACKED, Part=M, Msg_Send=1 and Msg_Recv=1) to that row, as shown in Table 8.

TABLE 8

| Path | UP | Retry | HOP | BW | DOWN | ACKHOP | Status | Part | Msg_Send | Msg_Recv |
|------|----|----|-----|-----|------|--------|--------|------|----------|----------|
| 1 | A | 1 | 2 | 5 | | | | | | |
| 1 | H | 0 | 3 | 5 | D | 1 | ACKED | M | 1 | 1 |
| 1 | F | 0 | 5 | 5 | | | | | | |

But because node H also has no spare bandwidth on its other spans, that reservation attempt also fails. Therefore, node E increments the retry value for that row to Retry=1, finds that the row for node F has Retry=0 and the next lowest HOP value (HOP=5), and therefore transfers the data for the reservation attempt to that row, as shown in Table 9. However, node F has no spare bandwidth on its other spans, and so this reservation attempt fails, too.

TABLE 9

| Path | UP | Retry | HOP | BW | DOWN | ACKHOP | Status | Part | Msg_Send | Msg_Recv |
|------|----|----|-----|-----|------|--------|--------|------|----------|----------|
| 1 | A | 1 | 2 | 5 | | | | | | |
| 1 | H | 1 | 3 | 5 | | | | | | |
| 1 | F | 1 | 5 | 5 | D | 1 | ACKED | M | 1 | 1 |
| 1 | G | 0 | 10 | 5 | | | | | | |

Because all rows in the restoration table now have Retry= 1, the bandwidth reservation attempt will begin again with node A, and cycle until either spare bandwidth becomes available or the retry value exceeds a predetermined retry limit for the network. The retry limit is selected according to various criteria, as would be apparent to one skilled in the relevant art. If the retry limit is exceeded, the node sends a REJ message back to the node that originated the ACK message.

But at this point, a PACK message arrives at node E from node G having HOP=10 and BW=5. In response, node E creates a new entry in its restoration table, as shown in Table 9. When the bandwidth reservation attempt for node F fails, as described above, node E first looks for the row in its restoration table having the lowest retry value; that row is now the row for node G (the fourth row in Table 9). Even though the HOP value for this row is higher than that for the other rows, the retry value takes precedence, and node E successfully reserves 5 spare links on span E-G.

In this manner, the adaptive retry feature of the present invention permits the restoration process to retry spans should bandwidth become available on those spans, while providing a mechanism to rapidly select a span that has not yet been tried, regardless of its hopcount value.

What is claimed is:

1. In a network including at least one communications path connecting a first channel to a second channel, said path having a source node connected to said first channel, a destination node connected to said second channel, and at least one tandem node interconnecting said source and destination nodes, the nodes interconnected by spans, wherein each span connects two nodes and comprises at least one link, the links being either working links or spare links, a method for use in restoring a disrupted communications path, comprising the steps of:

(a) at the source node, broadcasting along all spans having spare links a first restoration message;

(b) at one of the tandem nodes, upon reception of said first restoration message from a first node, selectively rebroadcasting said first restoration message based on the number of times said one of the tandem nodes has received said first restoration message;

(c) at the destination node, upon reception of said first restoration message from a second node, sending a second restoration message to said second node for conservatively reserving bandwidth on a first span, said first span connecting the destination node to said second node; and (d) at said one of the tandem nodes, upon reception of said second restoration message from a third node, sending said second restoration message to said first node, said second restoration message for conservatively reserving bandwidth on a second span connecting said one of said tandem nodes to said first node.

2. The method of claim 1, wherein said first restoration message includes the path ID and bandwidth of the disrupted path, further comprising the step of:

(e) informing the source and destination nodes of the path ID and bandwidth of the disrupted path.

3. The method of claim 2, further comprising the steps of:

(f) at the source node, on reception of said second restoration message from a fourth node, connecting at least one spare link in a third span, said third span connecting the source node to said fourth node, to said first channel and sending a confirmation message to said third node;

(g) at said one of the tandem nodes, on reception of said confirmation message, connecting at least one spare link in a fourth span, said fourth span connecting said one of the tandem nodes to said third node, to at least one spare link in said second span; and (h) at the destination node, upon reception of said confirmation message, connecting at least one spare link in said first span to said second channel, thereby restoring the disrupted communications path.

4. The method of claim 2, wherein step (e) comprises the step of releasing the bandwidth of the disrupted path.

5. The method of claim 1, wherein step (b) comprises the steps of:

(1) upon the reception of a first copy of said first restoration message, rebroadcasting said first restoration message along all spans except the span along which said first copy was received; and (2) upon the reception of a second copy of said first restoration message, sending said first restoration message along the span along which said first copy was received.

6. The method of claim 5, wherein said first restoration message includes information including the identity of said first node, the path ID and bandwidth of the disrupted path, and the hopcount via said first node to the source node, wherein step (b) further comprises the step of recording the information.

7. The method of claim 6, wherein step (b) further comprises the step of:

(4) modifying said first restoration message by incrementing said hopcount.

8. In a network including at least one communications path connecting a first channel to a second channel, said path having a source node connected to said first channel, a destination node connected to said second channel, and at least one tandem node interconnecting said source and destination nodes, the nodes interconnected by spans, wherein each span connects two nodes and comprises at least one link, the links being either working links or spare links, a system for use in restoring a disrupted path, comprising:

at the source node, broadcasting means for broadcasting along all spans having spare links a first restoration message;

at a tandem node, rebroadcasting means for, upon reception of said first restoration message from a first node, selectively rebroadcasting said first restoration message based on the number of times said tandem node has received said first restoration message;

at the destination node, first sending means for, upon reception of said first restoration message from a second node, sending a second restoration message to said second node for conservatively reserving bandwidth on a first span, said first span connecting the destination node to said second node; and at said tandem node, second sending means for, upon reception of said second restoration message from a third node, sending said second restoration message to said first node, said second restoration message for conservatively reserving bandwidth on a second span connecting said tandem node to said first node.

9. The system of claim 8, wherein said first restoration message includes the path ID and bandwidth of the disrupted path, further comprising:

means for informing the source and destination nodes of the path ID and bandwidth of the disrupted path.

10. The system of claim 9, further comprising:

at the source node, first connecting means for, on reception of said second restoration message from a fourth node, connecting at least one spare link in a third span, said third span connecting the source node to said fourth node, to said first channel and sending a confirmation message to said third node;

at said tandem node, second connecting means for, on reception of said confirmation message, connecting at least one spare link in a fourth span, said fourth span connecting said tandem node to said third node, to at least one spare link in said second span; and at the destination node, third connecting means for, upon reception of said confirmation message, connecting at least one spare link in said first span to said second channel, thereby restoring the disrupted communications path.

11. The system of claim 9, wherein said means for informing comprises means for releasing the bandwidth of the disrupted path.

12. The system of claim 8, wherein said rebroadcasting means comprises:

means for, upon the reception of a first copy of said first restoration message, rebroadcasting said first restoration message along all spans except the span along which said first copy was received; and means for, upon the reception of a second copy of said first restoration message, sending said first restoration message along the span along which said first copy was received.

13. The system of claim 12, wherein said first restoration message includes information including the identity of said first node, the path ID and bandwidth of the disrupted path, and the hopcount via said first node to the source node, wherein said rebroadcasting means further comprises means for recording the information.

14. The system of claim 13, wherein said rebroadcasting means further comprises means for modifying said first restoration message by incrementing said hopcount.

* * * * *